(12) United States Patent
Andino et al.

(10) Patent No.: US 8,454,862 B2
(45) Date of Patent: Jun. 4, 2013

(54) METHOD OF CREATING OPHTHALMIC LENSES USING MODULATED ENERGY

(75) Inventors: Rafael Victor Andino, Lawrenceville, GA (US); Angelika Maria Domschke, Duluth, GA (US); Joseph Michael Lindacher, Suwanee, GA (US); Courtney Flem Morgan, Alpharetta, GA (US)

(73) Assignee: Novartis AG, Basel (CH)

( * ) Notice: Subject to any disclaimer, the term of this patent is extended or adjusted under 35 U.S.C. 154(b) by 1756 days.

(21) Appl. No.: 11/253,889

(22) Filed: Oct. 19, 2005

(65) Prior Publication Data

US 2007/0023942 A1 Feb. 1, 2007

Related U.S. Application Data

(63) Continuation of application No. PCT/EP2005/008270, filed on Jul. 29, 2005.

(60) Provisional application No. 60/592,900, filed on Jul. 30, 2004.

(51) Int. Cl.
  *B29D 11/00* (2006.01)
  *G02B 1/12* (2006.01)
(52) U.S. Cl.
  USPC ......... 264/1.38; 264/1.32; 264/1.36; 264/496
(58) Field of Classification Search
  USPC ..................... 264/1.38, 1.36, 1.32
  See application file for complete search history.

(56) References Cited

U.S. PATENT DOCUMENTS

| | | | | |
|---|---|---|---|---|
| 4,575,330 A | * | 3/1986 | Hull | 425/174.4 |
| 5,204,206 A | * | 4/1993 | Iwase et al. | 430/253 |
| 5,760,100 A | * | 6/1998 | Nicolson et al. | 523/106 |
| 5,807,906 A | | 9/1998 | Bonvallot et al. | 522/182 |
| 6,113,817 A | | 9/2000 | Herbrechtmeier et al. | 264/1.36 |
| 6,139,146 A | * | 10/2000 | Zhang | 351/160 R |
| 6,450,642 B1 | * | 9/2002 | Jethmalani et al. | 351/219 |
| 6,613,498 B1 | * | 9/2003 | Brown et al. | 430/322 |
| 2002/0100990 A1 | * | 8/2002 | Platt et al. | 264/1.38 |
| 2003/0156250 A1 | | 8/2003 | Ono | 351/168 |
| 2004/0145700 A1 | | 7/2004 | Miniutti et al. | 351/159 |
| 2008/0024719 A1 | | 1/2008 | Kamishita et al. | 351/176 |

FOREIGN PATENT DOCUMENTS

| | | |
|---|---|---|
| EP | 658 418 A1 | 12/1994 |
| GB | 275460 | 11/1926 |
| JP | 61-53031 | 3/1986 |

OTHER PUBLICATIONS

Dudley, D., W. Duncan, and J. Slaughter, "Emerging Digital Micromirror Device (DMD) Applications", Proceedings of SPIE, vol. 4985 (2003), pp. 14-25.*
"TexLoc Refractive Index of Polymers", TexLoc Ltd., Feb. 25, 2005, available at http://web.archive.org/web/20050306012320/http://www.texloc.com/closet/cl_refractiveindex.html, pp. 1-9.*
Standard Search Report.
International Search Report.

* cited by examiner

*Primary Examiner* — William Bell
(74) *Attorney, Agent, or Firm* — Sheng-Hsin Hu

(57) ABSTRACT

This invention is related to lenses and the associated processes used to manufacture lenses. In particular, the present invention is related to a process for designing and creating bifocal, multifocal, and single vision ophthalmic lenses by modulating an energy source.

17 Claims, 5 Drawing Sheets

FIG. 2

METHOD OF CREATING OPHTHALMIC LENSES USING MODULATED ENERGY

This application is a continuation of International Patent Application PCT/EP05/008270, filed on Jul. 29, 2005, which claims the priority of U.S. patent application No. 60/592,900 filed Jul. 30, 2004.

This invention is related to ophthalmic lenses and the associated processes used to manufacture ophthalmic lenses. In particular, the present invention is related to a process for designing and creating bifocal, multifocal, and single vision ophthalmic lenses by modulating an energy source.

BACKGROUND

Contact lenses are widely used for correcting many different types of vision deficiencies. These include defects such as near-sightedness and far-sightedness (myopia and hypermetropia, respectively), astigmatism, and defects in near range vision usually associated with aging (presbyopia). Each type of defect requires a specific correction and coordinating manufacturing process or processes.

Astigmatism occurs because the refractive error in an eye is dependent upon spatial distribution of the optical error. Astigmatism is typically caused by one or more refractive surfaces, most commonly the anterior cornea, having a toroidal shape. Astigmatism can be corrected with an astigmatic ophthalmic lens, which usually has one spherical surface and one toroidal (cylindrical) surface.

Presbyopia occurs as a person ages because the lens of the eye loses its elasticity, eventually resulting in loss of the ability to focus at near distances. To compensate for presbyopia, ophthalmic lenses are required to be more positively powered or less negatively powered than the distance correction. Some presbyopic persons have both near vision and distance vision defects, requiring simultaneous or alternating vision lenses to properly correct their vision.

Simultaneous vision lenses refer to the class of bifocal or multifocal ophthalmic lenses in which optical power for distance vision and near vision are positioned simultaneously within the pupil area of a user's eye. They are generally composed of two or more concentric annular zones which alternately provide the distance and near power, or a multifocal zone having an aspheric surface which provides a continuous gradient of optical power over a selected range of powers.

Alternating vision refers to the class of segmented (translating) bifocal ophthalmic lenses in which the lens is divided into two or more optical zones. Typically the superior (upper) zone is for distance vision correction, whereas the lower zone is for near vision correction. The distance portion subtends the pupil of the eye in primary gaze. In downward gaze the add power or near portion (lower zone) of the lens subtends the pupil. Lenses for this type of defect can be created, for example, by molding, casting or lathing processes.

Additionally, some lens-wearers may need more than one correction. For example, a person with presbyopia may also have an astigmatism vision error. Those presbyopes may require ophthalmic lenses capable of correcting both astigmatism and presbyopia. Lenses that incorporate corrections for both types of defects usually combine one or more manufacturing processes or entail a lengthier single process.

Lenses that are designed to correct the above-referenced defects may be created through molding, casting or lathe-cutting. For example, contact lenses that are manufactured in large numbers are typically produced by a mold process. In those processes, the lenses are manufactured between two molds without subsequent machining of the surfaces or edges. Such mold processes are described, for example in U.S. Pat. No. 6,113,817, which is expressly incorporated by reference as if fully set forth herein. As such, the geometry of the lens is determined by the geometry of the mold. In a typical molding system, lenses are cycled through a series of stations on a semi-continuous basis. The cyclic portion of lens production generally involves dispensing a liquid crosslinkable and/or polymerizable material into a female mold half, mating a male mold half to the female mold half, irradiating to crosslink and/or polymerize, separating the mold halves and removing the lens, packaging the lens, cleaning the mold halves and returning the mold halves to the dispensing position. The polymerization of the material is determined by the application time, position, and amount of UV light applied. Similar to mold geometry, the UV radiation is generally altered for different types of lenses. As such, producing different types of lenses and powers may not be efficient.

For defocus or correction lenses there is typically one design parameter, which is the spherical power. Each different lens power requires at least one set of molding tools and/or molds. Hence, to provide a lens line serving most optical powers, a moderate number of molding tools and/or molds are needed. For toric lenses, at least three parameters must be considered: spherical power, cylindrical power, and the orientation of the cylindrical power. The permutations of all of these powers produce a large, almost unmanageable number of unique lens stock keeping units (SKUs), and an even larger number of molding tools and molds. Similarly, for multifocal lenses, a huge number of molding tools and molds is required.

Additionally, some persons require made-to-order (MTO) or customized lenses. Each customized lens required its own molding tools and molds. As such, the cost of MTO lenses is very high and may even be cost-prohibitive.

SUMMARY OF THE INVENTION

The present invention seeks to solve the problems listed herein by reducing the number of molding tools and molds to produce a large number of lenses of varying parameters. The present invention also seeks to provide a means for cost-effective production of MTO or customized lenses.

In accomplishing the foregoing, there is provided, in accordance with one aspect of the present invention, a method for designing a lens with multiple zones within the material bulk.

The invention, in another aspect, provides a method for creating a lens with one or more refractive indices in the optical zone of a lens that are spatially distributed throughout the optical portion of the lens to correspond with vision correction needs.

The invention, in a further aspect, provides a method of modulating or attenuating UV light to achieve differential curing of bulk material.

The invention, in a further aspect, provides methods for the design and manufature of toric lenses of varying power.

The invention, in another further aspect, provides methods for the design and manufacture of at least two optical zones in any configuration.

The invention, in still another aspect, provides methods for the design and manufacture of lenses with holographic or grating patterns.

The invention also provides a method for making an ophthalmic lens by providing fluid optical material, providing a mold, injecting the fluid optical material into the mold, and exposing both the mold and the fluid optical material to a modulated energy source to create at least one index of refraction in the optical zone of a lens. In this method, the energy source may be UV radiation. In another embodiment, modulating the energy source may be accomplished by varying the light intensity according to an illumination scheme. In a related embodiment, the light intensity variation may be accomplished by either a gray scale mask, using a uniform light source in optical connection with a digital mirror device (DMD), or by other similar spatial light modulators, including dynamic programmable masks. In a method in which a gray scale mask is used, the gray scale mask may be created by stereo lithography or by a computer-generated hologram. In a method in which a DMD is used, the DMD is preferably in optical connection with the uniform light source and the fluid optical material.

In another embodiment of the invention, the illumination scheme corresponds to a lens geometry. In another embodiment, the lens geometry may have more than one optical zone. In still another embodiment of the present invention the ophthalmic lens may be a toric lens, a bifocal lens, a multifocal lens, a customized lens or a single vision lens. In another embodiment the lens is designed to correct myopia, hypermetropia, proesbyopia, astigmatism, and/or defocus.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE DRAWINGS

FIG. 2 depicts a screen shot of a lens design program.

DETAILED DESCRIPTION OF THE EMBODIMENT

Figure 1A:
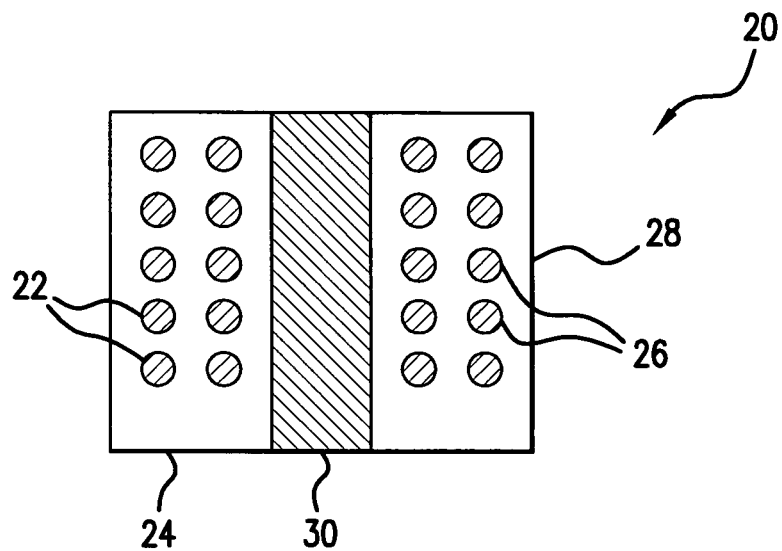
FIG. 1A illustrates a plan view of one embodiment of a mold carrier in an open position.

Reference now will be made in detail to the embodiments of the invention. It will be apparent to those skilled in the art that various modifications and variations can be made in the present invention without departing from the scope or spirit of the invention. For instance, features illustrated or described as part of one embodiment can be used in conjunction with another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention. All patents and patent applications disclosed herein are expressly incorporated by reference in their entirety.

Unless defined otherwise, all technical and scientific terms used herein have the same meaning as commonly understood by one of ordinary skill in the art to which this invention belongs. Generally, the nomenclature used herein and the manufacturing procedures are well known and commonly employed in the art. Conventional methods are used for these procedures, such as those provided in the art and various general references. Where a term is provided in the singular, the inventors also contemplate the plural of that term.

An "ophthalmic device," as used herein, refers to a contact lens (hard or soft), a corneal onlay, implantable ophthalmic devices used in, on or about the eye or ocular vicinity.

The term "contact lens" employed herein in a broad sense and is intended to encompass any hard or soft lens used on the eye or ocular vicinity for vision correction, diagnosis, sample collection, drug delivery, wound healing, cosmetic appearance (e.g., eye color modification), or other ophthalmic applications.

A "hydrogel material" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers. Exemplary hydrogels include, but are not limited to, poly(vinyl alcohol) (PVA), modified polyvinylalcohol (e.g., as nelfilcon A), poly(hydroxyethyl methacrylate), poly(vinyl pyrrolidone), PVAs with polycarboxylic acids (e.g., carbopol), polyethylene glycol, polyacrylamide, polymethacrylamide, silicone-containing hydrogels, polyurethane, polyurea, and the like. A hydrogel can be prepared according to any methods known to a person skilled in the art.

A "crosslinkable and/or polymerizable material" refers to a material which can be polymerized and/or crosslinked by actinic radiation to obtain crosslinked and/or polymerized material which are biocompatible. Examples of actinic radiation are UV irradiation, ionized radiation (e.g. gamma ray or X-ray irradiation), microwave irradiation, and the like.

"Polymer" means a material formed by polymerizing one or more monomers.

A "prepolymer" refers to a starting polymer which can be polymerized and/or crosslinked upon actinic radiation to obtain a crosslinked polymer having a molecular weight much higher than the starting polymer.

The term "fluid" as used herein indicates that a material is capable of flowing like a liquid.

"Fluid optical material" as used herein means a polymer, a prepolymer, a corsslinkable and/or polymerizable material, and/or a hydrogel material that is capable of flowing like a liquid.

The present invention is generally related to the manufacture and design of contact lenses. In one aspect, the present invention provides a method to produce a lens optical zone with a desired power by modulating an energy source to create varying light intensity according to an illumination scheme. The varied light intensity differentially cures the fluid optical material to create a spatial distribution of refractive indices in the optical zone of a lens within the cured lens. The intensity of the energy source, such as UV light, for example, is varied to manipulate the optical wavefront. The optical wavefront may be manipulated according to a specified pattern, such as a Zernike polynomial basis set or a presbyopic aberration pattern. The optical wavefront may be dervied from the aberrometry data, corneal topography data or calculated as with a presbyopic correction wavefront.

As will be readily appreciated by those of skill in the art, many different types of lenses are possible with the present invention. Contact lenses of the invention can be either hard or soft lenses. A contact lens of the invention can be a toric, multifocal, toric multifocal contact lens, customized contact lenses, or the like. Contact lenses of the present invention may also correct more than one type of defect, such as, for example, presbyopia and astigmatism. According to the present invention, each of these types of lenses may be created by an illumination scheme or energy modulation.

Soft contact lenses of the invention are preferably made from a fluid optical material, such as a silicon or fluorine-containing hydrogel or HEMA with material properties that allow modulation of a refractive index. It will be understood that any fluid optical material can be used in the production of a contact lens of the invention. Preferred materials and formulations suitable for this application preferably consist of pure or specifically modified hydrogels, preferably polyvinylalcohols (PVA) containing radiation activated crosslinkable functional groups that may be photoinitiated when exposed to a particular wavelength.

Ophthalmic lenses may be produced by double-sided molding (DSM) processes. These processes typically involve dispensing a liquid monomer into a female mold half, mating a male mold half to the female, and applying ultraviolet radiation to polymerize the monomers. Such molds may be injection molded or produced in any other feasible way known in the art. The female mold half may have a molding surface that defines the anterior (front) surface of a contact lens. The male mold half may have a molding surface that defines the posterior (back) surface of the lens. The polymerized lens removed from the molds in a DSM process does not usually require surface polishing, but subsequent extraction of unreacted monomer or solvent is commonly required.

An improvement of the DSM process is described in U.S. Pat. No. 6,113,817. This improvement may be semi-cyclic and preferably includes the steps of (a) dispensing crosslinkable and/or polymerizable material into a female mold half; (b) mating a male mold half to a female mold half to create a lens cavity; (c) applying radiation to crosslink and/or polymerize the crosslinkable and/or polymerizable material to form a lens; (d) separating the male mold half from the female mold half; (e) washing the mold halves and lens to remove unreacted crosslinkable and/or polymerizable material; (f) ensuring the lens is adjacent a selected mold half (e.g., the female mold half); (g) centering the lens within the selected mold half; (h) grasping the lens (e.g., in a central area) to remove the lens from the mold half; (i) at least partially drying the lens to remove surface water which may impair inspection of the lens; (j) inspecting the lens; (k) depositing an acceptable lens into packaging; (l) cleaning the male and female mold halves; and (m) indexing the male and female mold halves to a position for dispensing crosslinkable and/or polymerizable material. This semi-continuous, partially cyclic molding process reuses or recycles the mold halves used to retain the fluid optical material and give the lens its shape.

The semi-continuous, partially cyclic molding process may be operated with a single mold cycling through the process. However, in a preferred embodiment, the process utilizes a plurality of molds arranged and aligned in a molding carrier in order to improve process efficiency. For example, FIG. 1A illustrates a plan view of one embodiment of a molding carrier 20 having an array of ten complete molds. Molding carrier 20 includes an array of ten female mold halves 22 removably positioned in a first housing 24. Molding carrier 20 further includes an array of ten male mold halves 26 removably positioned in a second housing 28. First housing 24 is affixed to second housing 28 by a pivoting means 30, which allows second housing 28 to articulate towards first housing 24 in order to releasably mate the male and female mold halves. Thus, first housing 24 is hingedly affixed to second housing 28.

Figure 1B:
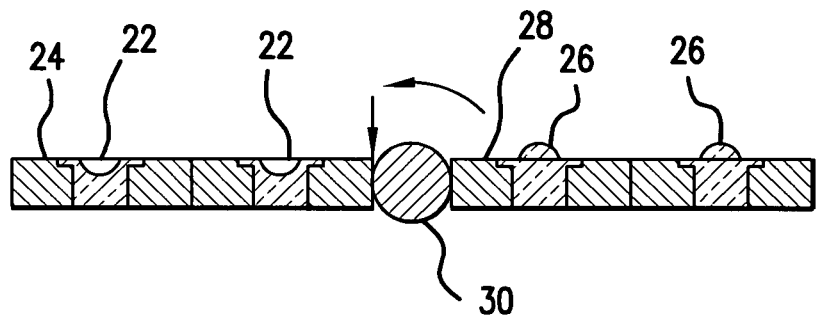
FIG. 1B shows an end sectional view of the FIG. 1A mold carrier in an open position.
Figure 1C:
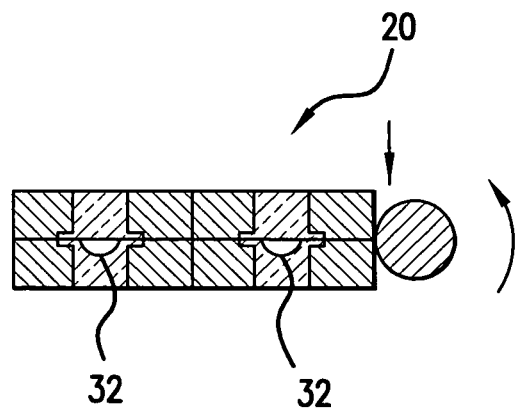
FIG. 1C shows an end sectional view of the FIG. 1A mold carrier in a closed position.

In operation, a fluid optical material (or a solution or dispersion thereof) is dispensed into female mold halves 22. Male mold halves 26 are mated with female mold halves 22 by rotating and linearly moving second housing 28, as showing by the arrow in FIG. 1B to create a mold cavity. Molding carrier 20 is shown in a closed position (i.e., molding position) in FIG. 1C. In FIG. 1C, all ten pairs of mold halves are mated, thereby defining ten molding cavities 32 in which a lens may be formed.

The mold halves may be formed from a number of materials, at least one of which transmits the desired radiation for crosslinking and/or polymerization, preferably in the ultraviolet range. One preferred material which may be used for reusable molds is quartz. Preferably only one mold half transmits sufficient radiation while the other does not. Quartz offers substantial advantages in durability, thereby allowing the molds to be reused a remarkable number of times without affecting product quality. However, quartz molds may be quite expensive. Alternatively, the mold halves may be molded from a polymeric material, at least one of which transmits the desired radiation. Examples of suitable mold materials include PMMA, polycarbonate, Zenex, Zenor, OPI Resin by Hitachi, an amorphous, transparent copolymer based on cyclic and linear olefins sold under the trademark TOPAS®, polystyrene, polypropylene and poly(acrylonitriles) sold under trademark BAREX®.

In a preferred embodiment, the mold halves of at least one of the set of male mold halves or the set of female mold halves includes a peripheral region which blocks light (especially UV light) during polymerizing and/or crosslinking. Use of such a light blocking periphery enables a precise definition of the edge of the lenses which are formed. This region may be produced by depositing a metallic or UV absorbing coating in the region outside the lens forming surfaces of the mold halves.

The design of the lens involves the creation of a zone or multiple zones within the material bulk within the lens geometry. The lens geometry may contain a single refractive index or multiple refractive indices in the optical zone of a lens, depending upon the type of correction needed. In general, most current lenses have a substantially uniform index of refraction.

The present invention seeks to produce a lens with a spatial distribution of refractive index/indices. Additionally, the lens may comprise a zone with a varying index gradient. The index or indices of refraction, in combination with or in lieu of a surface geometry optical design preferably create the optical power of the lens. The location of these zones is determined by the desired optical design of the lens. The zone or zones with a constant or varying index gradient may be used to produce a single vision lens, a toric lens, a bifocal lens, a multifocal lens or any combination thereof.

The power of the lens is a function of the curvature of the anterior and posterior surfaces. Specifically, the power of the lens is measured in diopters, which is the reciprocal of the focal length of the lens:

$$\frac{1}{f} = (n-1)\left(\frac{1}{r_1} - \frac{1}{r_2}\right) + \frac{(n-1)^2}{n}\frac{t_c}{r_1 r_2}$$

where
n=refractive index
$t_c$=center thickness
$r_1$=radius of curvature of first surface (positive if center or curvature is to right)
$r_2$=radius of curvature of second surface (negative if center of curvature is to left).

Typically, the surface of a lens is changed to alter the focal length, which corrects vision; however, the present invention seeks to correct vision by altering the refractive index.

The most commonly used optical surface or shape is a spherical surface. The sphere is centered on the optical axis. The "sag" or z-coordinate of a standard spherical surface is given by:

Standard Spherical Surface $$z = \frac{cr^2}{1+\sqrt{1-(1+k)c^2r^2}}$$

where
c=curvature (reciprocal of the radius)
r=radial coordinate in lens units
k=conic constant; the conic constant is less than −1 for hyperbolas, −1 for parabolas, between −1 and 0 for ellipses, 0 for spheres, and greater than 0 for oblate ellipsoids A biconic surface best defines the lens surface or shape of a toric lens. The "sag" or z-coordinate of a biconic surface is given by:

Biconic Surface $$z = \frac{c_x x^2 + c_y y^2}{1+\sqrt{1-(1+k_x)c_x^2 x^2 - (1+k_y)c_y^2 y^2}}$$

where $c_x = \frac{1}{r_x}$, $c_y = \frac{1}{r_y}$,

A reference index of refraction can be defined by the following equation:

$$n_{ref} = n_0 + n_{r2}r^2 + n_{r4}r^4 + n_{z1}z + n_{z2}z^2 + n_{z3}z^3 + n_{z4}z^4$$

where $$r^2 = x^2 + y^2$$

The reference index of refraction can be used to calculate the reference wavelength. The refractive index at any other wavelength can then be computed using the following general expansion of the Sellmeier formula:

$$n(\lambda)^2 = n(\lambda_{ref})^2 + \sum_{i=1}^{3} \frac{K_i(\lambda^2 - \lambda_{ref}^2)}{\lambda^2 - L_i},$$

where $K_i$ and $L_i$ define the dispersion of the material. The dispersion is a material property and is known in the art.

All of the preceding calculations are typically performed by an optical design software program as described below once certain parameters are entered by a user.

The lens design included in the present invention seeks to cancel or correct optical aberrations and defocus. The two basic methods for correcting defect/defocus involve designing a lens surface profile or by changing the index or indices of refraction by the cure. The present invention seeks to correct vision by spatially distributing the index or indices of refraction in the optical zone of a lens to compensate for defects. A lens design may be pre-designed as a generic lens or can be specially designed for a user.

In a specific embodiment in which an ophthalmic lens is designed for the user, an ophthalmic wavefront sensor may be used to measure the irregularities on the eye, such as for example, a Shack-Hartmann wavefront sensor. Measurements of the wavefront aberrations of the eye to a high degree of precision using an improved Hartmann-Shack wavefront sensor are described in U.S. Pat. No. 5,777,719, which is expressly incorporated by reference as if fully set forth herein.

Starting at the retina, an ideal wavefront is generated, which passes through the optical path of the eye. The wavefront sensor illuminates the fovea with a narrow-beam light source, typically a laser diode or an LED, and records the position of the scattered light through a lenslet array. As the wavefront (the optical wavefront of the electromagnetic wave from the optical element) exits the eye, it contains a complete map of the eye's aberrations for analysis by the sensor. The lenslet array breaks up the nearly collimated beam into points on a digital camera, typically a CCD or a CMOS imager. Once the wavefront is received by the sensor, a complex series of analyses may be performed to provide a more complete picture of the eye's optical path. The data may then be fit to a Zernike basis set.

The essential data provided by a Hartmann-Shack wavefront sensor that is modified to measure the human eye are the directions of the optical rays emerging through the eye's pupil. The method of deriving a mathematical expression for the wavefront from this directional ray information is described in U.S. Pat. No. 5,777,719. First, the wavefront is expressed as a series of Zernike polynomials with each term weighted initially by an unknown coefficient. Next, partial derivatives (in x & y) are then calculated from the Zernike series expansion. Then, these partial derivative expressions respectively are set equal to the measured wavefront slopes in the x and y directions obtained from the wavefront sensor measurements. Finally, the method of least-squares fitting of polynomial series to the experimental wavefront slope data is employed which results in a matrix expression which, when solved, yields the coefficients of the Zernike polynomials. Consequently, the wavefront, expressed by the Zernike polynomial series, may be completely and numerically determined numerically at all points in the pupil plane. The least-squares fitting method is discussed in chapter 9, Section 11 of "Mathematics of Physics and Modern Engineering" by Sokolnikoff edheffer (McGraw-Hill, New York, 1958). The benefit of this analysis is that the wavefront can be broken into independent mathematical components that represent specific aberrations.

A table of the proposed OSA Standard (Optical Society of America) Zernike Polynomials up to 7th order is displayed below (More information on Zernike polynomials is available on http://color.eri.harvard.edu/standardization/standards_TOPS4.pdf).

Table of Zernike Polynomials in Polar Coordinates up to 7$^{th}$ order (36 terms)

| j | n | m | $Z_n^m (\rho, \theta)$ |
|---|---|---|---|
| 0 | 0 | 0 | 1 |
| 1 | 1 | −1 | $2\rho \sin \theta$ |
| 2 | 1 | 1 | $2\rho \cos \theta$ |
| 3 | 2 | −2 | $\sqrt{6} \rho^2 \sin 2\theta$ |
| 4 | 2 | 0 | $\sqrt{3} (2\rho^2 - 1)$ |
| 5 | 2 | 2 | $\sqrt{6} \rho^2 \cos 2\theta$ |
| 6 | 3 | −3 | $\sqrt{8} \rho^3 \sin 3\theta$ |
| 7 | 3 | −1 | $\sqrt{8} (3\rho^3 - 2\rho) \sin \theta$ |
| 8 | 3 | 1 | $\sqrt{8} (3\rho^3 - 2\rho) \cos \theta$ |
| 9 | 3 | 3 | $\sqrt{8} \rho^3 \cos 3\theta$ |
| 10 | 4 | −4 | $\sqrt{10} \rho^4 \sin 4\theta$ |
| 11 | 4 | −2 | $\sqrt{10} (4\rho^4 - 3\rho^2) \sin 2\theta$ |
| 12 | 4 | 0 | $\sqrt{5} (6\rho^4 - 6\rho^2 + 1)$ |
| 13 | 4 | 2 | $\sqrt{10} (4\rho^4 - 3\rho^2) \cos 2\theta$ |
| 14 | 4 | 4 | $\sqrt{10} \rho^4 \cos 4\theta$ |
| 15 | 5 | −5 | $\sqrt{12} \rho^5 \sin 5\theta$ |
| 16 | 5 | −3 | $\sqrt{12} (5\rho^5 - 4\rho^3) \sin 3\theta$ |
| 17 | 5 | −1 | $\sqrt{12} (10\rho^5 - 12\rho^3 + 3\rho) \sin \theta$ |
| 18 | 5 | 1 | $\sqrt{12} (10\rho^5 - 12\rho^3 + 3\rho) \cos \theta$ |
| 19 | 5 | 3 | $\sqrt{12} (5\rho^5 - 4\rho^3) \cos 3\theta$ |
| 20 | 5 | 5 | $\sqrt{12} \rho^5 \cos 5\theta$ |
| 21 | 6 | −6 | $\sqrt{14} \rho^6 \sin 6\theta$ |
| 22 | 6 | −4 | $\sqrt{14} (6\rho^6 - 5\rho^4) \sin 4\theta$ |
| 23 | 6 | −2 | $\sqrt{14} (15\rho^6 - 20\rho^4 + 6\rho^2) \sin 2\theta$ |
| 24 | 6 | 0 | $\sqrt{7} (20\rho^6 - 30\rho^4 + 12\rho^2 - 1)$ |
| 25 | 6 | 2 | $\sqrt{14} (15\rho^6 - 20\rho^4 + 6\rho^2) \cos 2\theta$ |
| 26 | 6 | 4 | $\sqrt{14} (6\rho^6 - 5\rho^4) \cos 4\theta$ |
| 27 | 6 | 6 | $\sqrt{14} \rho^6 \cos 6\theta$ |
| 28 | 7 | −7 | $4 \rho^7 \sin 7\theta$ |
| 29 | 7 | −5 | $4 (7\rho^7 - 6\rho^5) \sin 5\theta$ |
| 30 | 7 | −3 | $4 (21\rho^7 - 30\rho^5 + 10\rho^3) \sin 3\theta$ |
| 31 | 7 | −1 | $4 (35\rho^7 - 60\rho^5 + 30\rho^3 - 4\rho) \sin \theta$ |
| 32 | 7 | 1 | $4 (35\rho^7 - 60\rho^5 + 30\rho^3 - 4\rho) \cos \theta$ |
| 33 | 7 | 3 | $4 (21\rho^7 - 30\rho^5 + 10\rho^3) \cos 3\theta$ |
| 34 | 7 | 5 | $4 (7\rho^7 - 6\rho^5) \cos 5\theta$ |
| 35 | 7 | 7 | $4 \rho^7 \cos 7\theta$ |

In an embodiment without astigmatism or that is not a MTO lens, the power needed, and hence the required refractive index or indices are known. Other parameters such as diameter and base curve are also known. These types of lenses are designed to correct defocus and are made in specific known diopters with specific known geometries. Hence, minimal calculation is needed to determine the illumination scheme because less indices of refraction may be needed to correct defocus. In an embodiment in which a progressive lens is needed for presbyopia, errors are accounted for by the Zernike index and the progressive addition profile of the lens.

The material's Δn, is the difference in the resultant index at the minimal required exposure and the resultant index at the maximum allowed cure exposure. Curing the lens outside of defined limits will result in under-cured or over-cured lenses. The lens designs incorporate the Δn the calculations. A digital mirror device (DMD)., which is optically linked, may act as a localized curing modulator. In the preferred embodiment, the DMD controls the index of refraction along the surface of the lens (x,y) lateral plane while the "n-parameter" along the z-axis (into the lens) remains constant.

As previously stated and as is well known to those skilled in the art, lens design for a contact lens can be carried out by using an optical design system and a mechanical CAD system. The design of the optical model lens can be transformed by, for example, a mechanical CAD system, into a set of mechanical lens design that includes optical zones, non-optical zones and non-optical features. Exemplary non-optical zones and features of a contact lens include, but are not limited to bevel, lenticular, the edge that joins the anterior and posterior surfaces of a contact lens, orientation features, and the like. Exemplary orientation features include, but are not limited to, a prism ballast or the like that uses a varying thickness profile to control the lens orientation, a faceted surface (e.g., ridge-off zone) in which parts of the lens geometry are removed to control the lens orientation, and ridge feature that orients the lens by interacting with the eyelid. Preferably, when transforming the design of an optimized optical model lens into a mechanical lens design, some common features of a family of contact lenses can be incorporated. Any known, suitable mechanical CAD system can be used in the invention. Preferably, a mechanical CAD system capable of representing precisely and mathematically high order surfaces is used to design a contact lens. An example of such mechanical CAD system is Pro/Engineer.

Preferably, the design of a contact lens may be translated back and forth between the optical CAD and mechanical CAD systems using a translation format which allows a receiving system, either optical CAD or mechanical CAD, to construct NURBs (non uniform rational B-splines) or Beizier surfaces of an intended design. Exemplary translation formats include, but are not limited to, VDA (Verband Der Automobilindustrie) and IGES (Initial Graphics Exchange Specification). By using such translation formats, overall surface of lenses can be in a continuous form that facilitates the production of lenses having radially asymmetrical shapes. Beizier and NURBs surface are particular advantageous for presbyopic design because multiple zones can be blended, analyzed and optimized.

After the optical and mechanical design for a contact lens is completed, a lens design is preferably in a neutral file format, for example, such as IGES or VDA, or in a proprietary file format (for example, a Pro/E file format).

Figure 2:
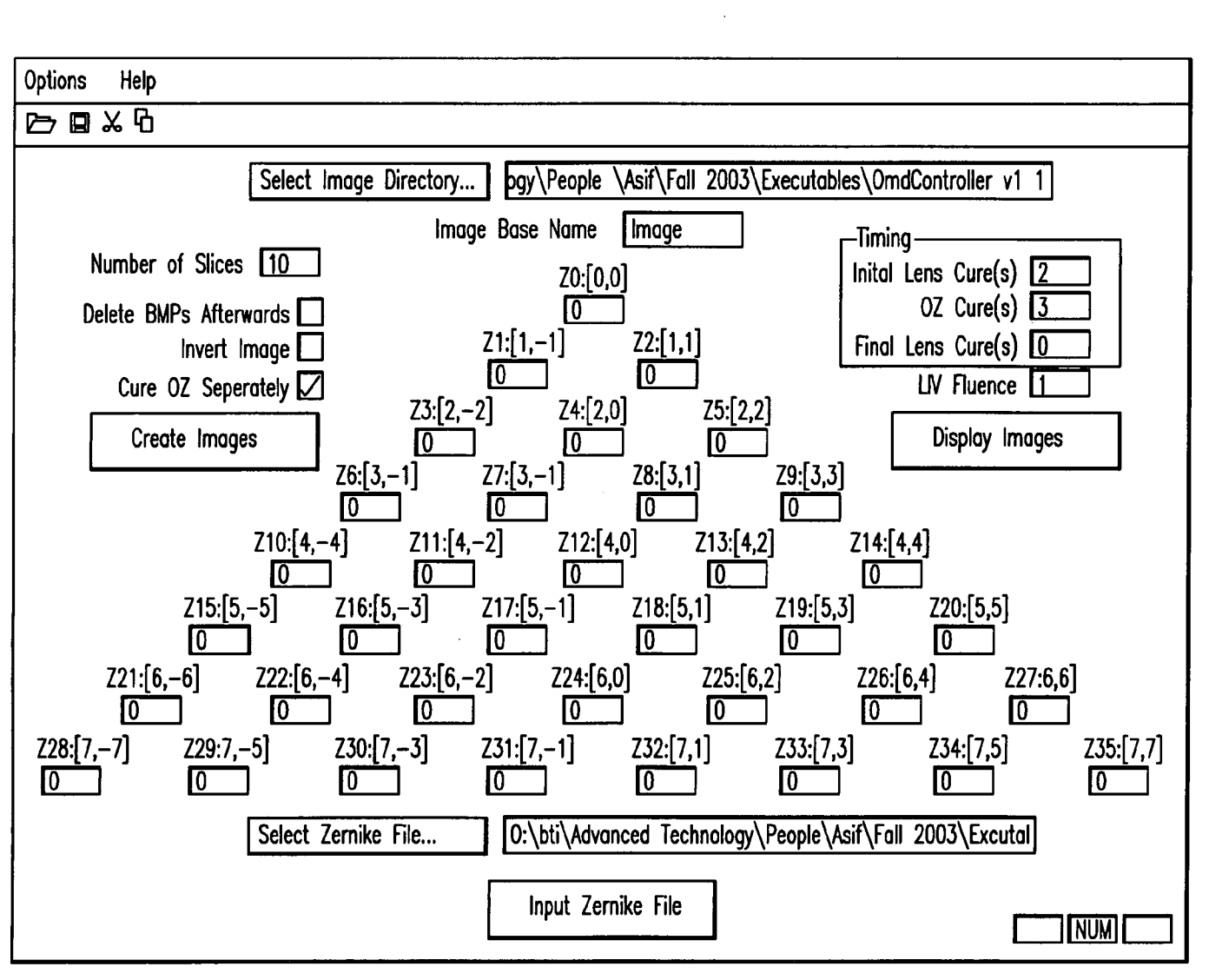

After the known defects are fit into a Zernike or similar mathematical representation, the mathematical representation is converted into optical power. This conversion is accomplished through use of an optical software program, as shown in FIG. 2, such as sold under trademark ZEMAX® by ZEMAX Development Corporation (San Diego, Calif.), sold under trademark Code V® by Optical Research Associates (ORA) (Pasadena, Calif.), sold under trademark OSLO® by Sinclair Optics (Fairport, N.Y.), and sold under trademark ASAP® by Breault Research Organization (Tucson, Ariz.). These programs use mathematical formulas presented earlier, as well as others, to calculate the lens design and the correction needed to effectively cancel the defect. The user may electronically input the properties of the eye such as shape, refraction, reflection, index, gradient index, thermal, polarization, transmission, and diffraction, for example. The software then models sequential and non-sequential imaging and corrects the defects by determining what index or indices of refraction are needed to make the focus over the pupil uniform. This may, in effect, require different indices of refraction over the lens. The software seeks to normalize the index of refraction over the pupil to provide uniform focus over the pupil. The necessary correction then becomes the appropriate lens design.

After the necessary lens is designed, it is then manufactured. As stated previously, changing the index or indices of refraction via the cure process creates the spatial distribution of the refractive indices that is needed to provide the proper lens for a particular aberration. This is accomplished by energy modulation during the cure process.

During the manufacturing process, the molding tool is indexed to a stage in which a form of radiation is impinged upon the molds, which allow substantially all of the radiation to transmit there through, and contact the fluid optical material. Preferred wavelengths of radiation are in the ultraviolet (UV) range and may be dependant upon the wavelength needed to photoactivate the fluid optical material. Preferably, the wavelength will correspond to the excitation wavelength of a photoinitiator. The appropriate intensity and exposure time needed to effect a particular index of refraction in a particular material is known by those of skill in the art.

The irradiation period is preferably less than about 5 minutes, more preferably less than about a minute and even more preferably less than about 10 seconds. Irradiation may be accomplished in one step or stage of the process, but this is not a requirement because more than one stage of the process may be used for irradiation. For example, if a uniform stage duration of about 4 seconds is selected for the process, but an irradiation time of about 6 seconds is desired, two irradiation stages may be inserted into the process to provide adequate irradiation. Additionally, a pre-cure step may be used, or additional irradiation stages may be used. For example, uniform radiation may be applied for a short period of time to produce a uniform refractive index, such as, for example, an index of refraction of about 1.4. This pre-cure may them be followed by a second, non-uniform period of irradiation to reach a desired index of refraction, such as about 1.5 for example, as described below.

The required irradiation period is a function of the intensity of applied radiation, the chosen prepolymer, and the particular photoinitiator used. A preferred intensity of ultraviolet radiation for poly(vinyl alcohol) prepolymers is about 1-5 milliwatts per square centimeter, more preferably about 2 to about 3.5 mW/cm$^2$, and even more preferably about 2.8 to 3.2 mW/cm$^2$. A preferred wavelength of applied radiation is about 280 to about 380 nanometers, more preferably about 305 to about 350 nm. Other wavelengths may also be used for other fluid optical materials and their photoactivation wavelengths.

In a preferred embodiment of the present invention, the fluid optical material, such as a hydrogel, will cure to produce a spatial distribution of refractive indices. This spatial distribution is preferably created in a pattern equivalent to the light intensity and illumination scheme. The difference in the index of refraction is proportional to the irradiance distribution and thus inversely proportional to the optical density (OD). The greater the index of refraction of the material, the greater the power difference in various optical zones of the lens. As stated previously, to provide vision correction, the index of refraction over the pupil must be uniform. By changing the refractive index of the lens in specific known areas of the lens to compensate for known deficiencies found in the uncorrected eye, the index of refraction can be normalized.

In one embodiment of the present invention, modulating the energy source is accomplished through use of a gray scale mask. In an embodiment using a gray scale mask, the mask has a varying OD that controls the intensity of the UV light or other energy source into the mold, forming different indices of refraction or index of refraction gradients. In an embodiment using a gray scale mask, the mask may be made using stereo lithographic techniques allowing a high degree of precision within the mask design. The design of the mask and the ability of certain parts of the mask to allow more or less penetration of the light energy may be a function of the design and fabrication process. The design of the mask preferably corresponds to the desired design of the lens in question, where the desired index of refraction imparted in the material is dependant on the amount of light energy the mask allows to penetrate into the lens mold cavity. The mask may also be affected by the light intensity.

In another embodiment of the present invention, a spatial light modulator may be used to vary the light intensity.

Various illumination systems may be used within the scope of the present invention. In one embodiment, a custom ultraviolet (UV) illumination system may be used to image a planar photomask onto a convex or concave lens surface. In the present invention, it is preferable to have a substantially uniform light source, i.e., a uniform intensity distribution, which is in optical connection with a DMD. For example, if the light source is a UV bulb, a Koehler or Abbe illumination system may be used. In another embodiment, a UV source with a liquid light guide may be used in conjunction with a homogenizer. In embodiments in which a laser light source is used, the light may be collimated and thus, further homogenization of the light may not be necessary. In another embodiment, the illumination pattern preferably compensates for non-uniformity in the curing UV field.

In a preferred embodiment, the lens may be cured from the concave side of the mold. The field curvature of the illumination system may be designed to project the desired lens design onto the convex surface of the lens. The UV system preferably projects a desired illumination/irradiance distribution onto a mold cavity. Such projection may produce a radius of curvature on the order of about 8.6 mm. Other radii may also be produced if needed.

Figure 3A:
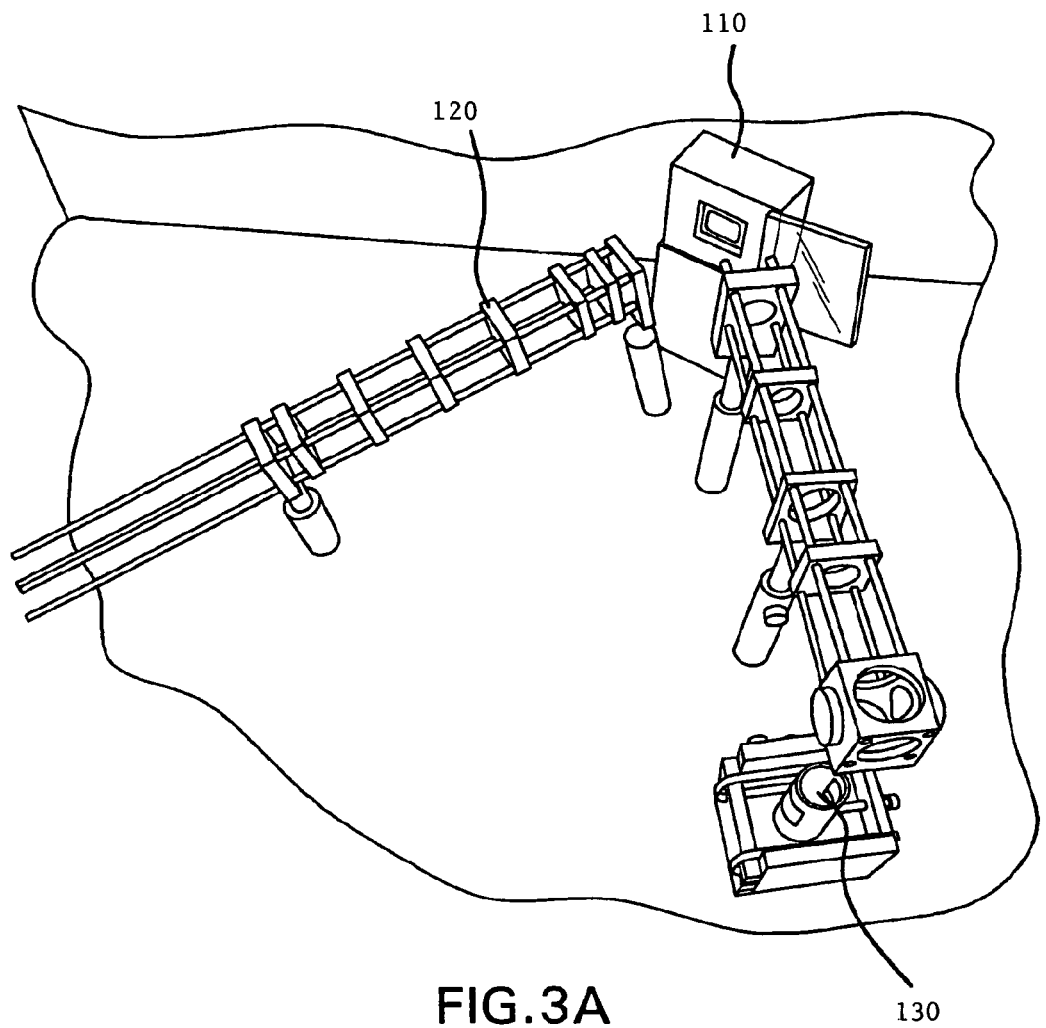
FIG. 3A depicts a plan view of a DMD according to an experimental setup of the present invention.
Figure 3B:
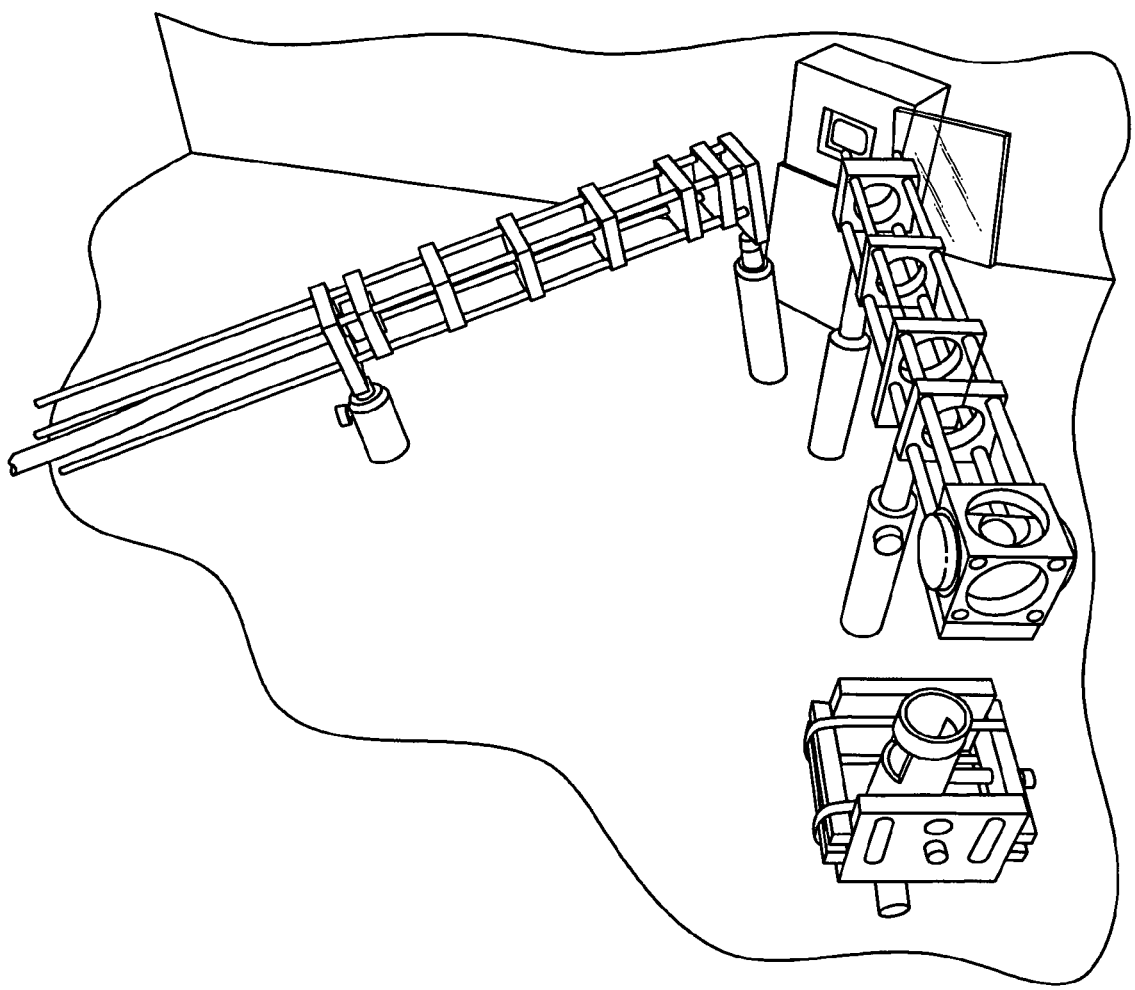
FIG. 3B depicts a plan view of a DMD according to an experimental setup of the present invention.
Figure 3C:
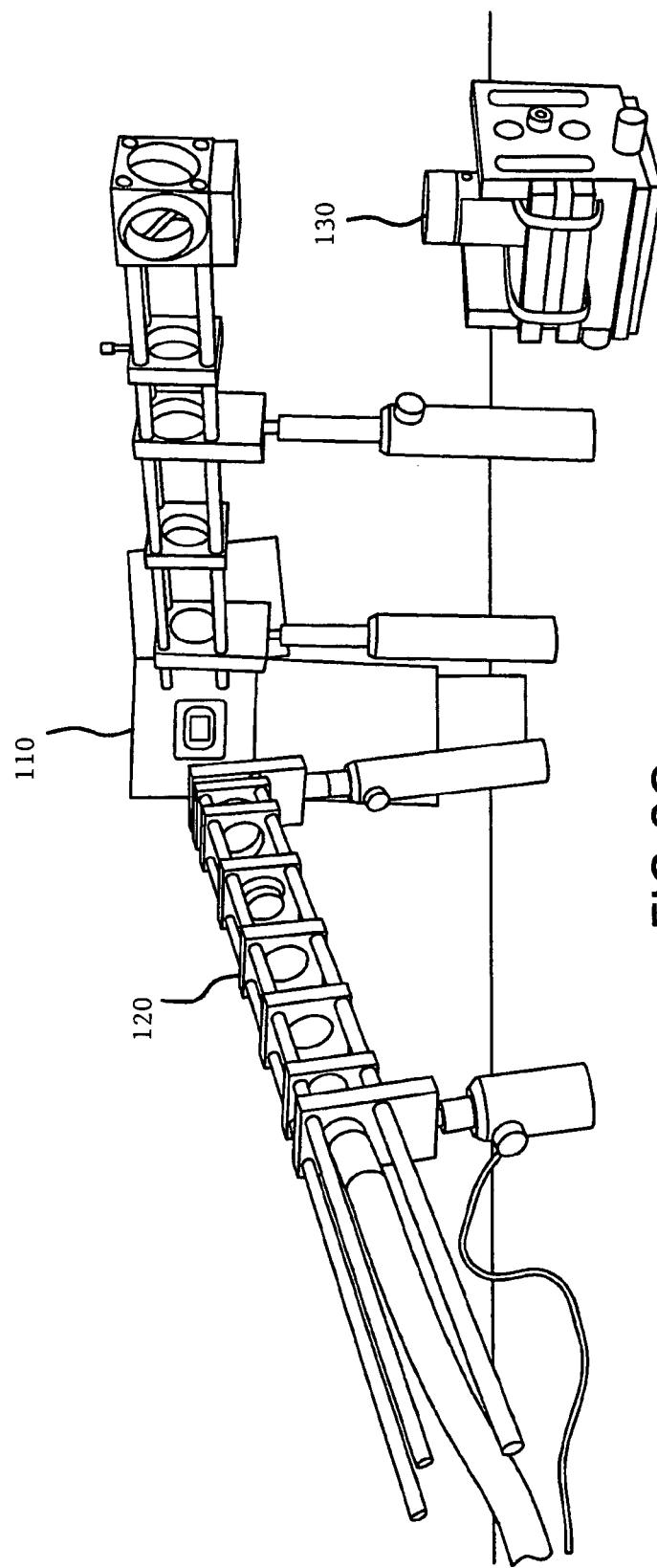
FIG. 3C depicts a frontal view of a DMD according to an experimental setup of the present invention.

In a preferred embodiment, energy modulation may be accomplished using a digital mirror device (DMD). In still another embodiment, the DMD may utilize micro-electro mechanical systems (MEMS). In an embodiment using a DMD, the DMD software in conjunction with a MEMS device modulates the intensity/irradiance of the light according to an illumination scheme corresponding to the lens design to create a spatial distribution of the needed refractive indices. Various views of an experimental setup of this concept are shown in FIGS. 3A, 3B, and 3C, which depict an optical setup of the present invention. FIGS. 3A, 3B, and 3C do not include a light source but do show a DMD 110, a plurality of lenses 120 that produce a collimated light source, and a mold 130. In some embodiments, the plurality of lenses may not be needed. This setup is exemplary only and may be modified or compressed for a large scale manufacturing process, among other reasons.

As stated previously, certain parameters are necessary for a complete lens design. These parameters are used to calculate the proper light intensity and pattern by particular software programs already disclosed here and their equivalents. In a preferred embodiment, the DMD and its software control a plurality of mirrors to on or off positions that are dependent upon the lens design. When the light source is incident on the DMD, the computer board associated with the DMD preferably controls the mirrors to reflect and modulate the desired intensity/irrandiance pattern onto the fluid ophthalmic material by switching them on or off. In another embodiment, the computer board associated with the mirrors may calculate and correct for distortion and other optical noise in the system.

In this invention, specific types of modification are preferably used to precisely transfer energy modulation into material density modulation. Such precision results in electron density modulation and thus the desired refractive index modulation. These types of modification preferably involve a suitable PVA formula, such as that described in U.S. Pat. Nos. 5,508,317; 5,583,163; 5,789,464; and 5,849,810, which are incorporated by reference as if fully set forth herein. Other similar prepolymers, including those used to make holographic lenses, such as gelatin-based prepolymers, may also be used. These materials are described in U.S. Pat. No. 5,508, 317, which is incorporated by reference as if fully set forth herein. The first preferred material modification may comprise a material formulation based on a PVA formulation as described in the patents listed above, A second material formulation preferably contains refractive index enhancing modifiers chemically attached to the hydrogel backbone that may be substituted benzaldehydes reacted with hydroxy groups of the PVA to cyclic acetals. The introduction of aromatic moieties into the polymer matrix increases the overall refractive index of the matrix, which leads to increased refractive index differences between areas of different polymer densities. Additional increase of refractive index differences is encouraged by aromat/polymer interactions, which enhance the packing order of the polymer chains in high-density areas as well as achieving higher efficiencies. Because the modifiers are chemically bond to the polymer matrix, the material remains biocompatible, without requiring additional extraction steps after the lens production.

In another preferred embodiment, a crosslinkable and/or polymerizable fluid material is an aqueous solution of one or more prepolymers and optionally one or more vinylic monomers, wherein the aqueous solution includes low molecular weight additives, such as NaCl, which exhibit a limited compatibility with a polymer resulted from the crosslinkable and/or polymerizable fluid material, but good compatibility with water. By virtue of the limited compatibility, the additive causes an osmotic gradient, which induces a contraction of a resulting polymer matrix. It is believed that the additive separates during the hologram recording period from areas of high irradiation intensity, in which the polymerizing and/or crosslinking process is initiated, into areas of low irradiation intensity. Such separation causes an osmotic gradient, followed by localized dehydration and contraction of the resulting polymer matrix. As a consequence, refractive index differences between high and low irradiated areas increase and high efficiency materials are obtained. High and low irradiated areas are caused by the pattern of interference fringes. Because, for example, NaCl is a component of the lens storage solution, no extraction process is necessary during the lens preparation process. Other additives, with similar properties may also be added, such as HEMA or other hydrophilic monomers.

To facilitate the photocrosslinking and/or polymerizing process, it is desirable to add a photoinitiator, which can initiate radical crosslinking and/or polymerizing. Exemplary photoinitators suitable for the present invention include benzoin methyl ether, 1-hydroxycyclohexylphenyl ketone, Durocure® 1173 and Irgacur® photoinitators. Preferably, between about 0.3 and about 5.0%, based on the total weight of the polymerizable formulation, of a photoinitiator is used. Additionally a sensitizer may be added to enhance the energy transer process.

In accordance with the present invention, a crosslinkable and/or polymerizable fluid material is capable of transferring energy modulation into material density modulation, which subsequently results in the desired refractive index modulation.

What is claimed is:

1. A method for making an ophthalmic lens comprising
Providing a fluid optical material;
Providing a mold;
Injecting said fluid optical material into said mold;
Exposing said mold and fluid optical material to an energy source; and
modulating said energy source to create a spatial distribution of refractive indices in the optical zone of the lens, wherein the fluid optical material comprises a prepolymer, a photoinitiator, wherein the prepolymer is a derivative of a polyvinyl alcohol and having a chemically attached refractive index enhancing modifier.

2. The method of claim 1, wherein said energy source is selected from the group consisting of UV light.

3. The method of claim 1 wherein said modulating step source further comprises varying light intensity according to an illumination scheme.

4. The method of claim 3, wherein said variation is accomplished by creating a gray-scale mask.

5. The method of claim 4, wherein said gray scale mask is created using stereo lithography.

6. The method of claim 4 wherein said gray scale mask is created using a computer-generated hologram.

7. The method of claim 4 wherein said gray scale mask masks said energy source in an illumination scheme, wherein said scheme corresponds to a desired lens geometry.

8. The method of claim 7, wherein said desired lens geometry has more than one optical zone.

9. The method of claim 3, wherein said varying light intensity further comprises providing a uniform light source in optical connection with a DMD.

10. The method of claim 9 wherein said DMD is in optical connection with said fluid optical material.

11. The method of claim 3, wherein said illumination scheme corresponds to a desired lens geometry.

12. The method of claim 1, wherein said exposing step further comprises curing said fluid optical material into a lens.

13. The method of claim 1 wherein said ophthalmic lens is selected from the group consisting of: a bifocal lens, a multifocal lens, a toric lens, a customized lens and a single vision lens.

14. The method of claim 1, wherein said ophthalmic lens is designed to correct one or more of the following defects: myopia, hypermetropia, presbyopia, defocus, and astigmatism.

15. The method of claim 1, wherein said fluid optical material further comprises a sensitizer.

16. The method of claim 1, wherein said fluid optical material comprises an additive.

17. The method of claim 1, wherein said fluid optical material comprises NaCl.

* * * * *